US012458670B2

(12) United States Patent
Leonard

(10) Patent No.: US 12,458,670 B2
(45) Date of Patent: Nov. 4, 2025

(54) CONTROLLING A PATHOGEN'S RESISTANCE TO IMMUNE SURVEILLANCE

(71) Applicant: IMMUNE MACRO-BIOTIC TECHNOLOGY UK LIMITED, Paignton (GB)

(72) Inventor: Christopher Jeremy Leonard, Devon (GB)

(73) Assignee: IMMUNE MACRO-BIOTIC TECHNOLOGY UK LIMITED, Devon (GB)

( * ) Notice: Subject to any disclaimer, the term of this patent is extended or adjusted under 35 U.S.C. 154(b) by 161 days.

(21) Appl. No.: 17/198,562

(22) Filed: Mar. 11, 2021

(65) Prior Publication Data

US 2021/0283192 A1 Sep. 16, 2021

(30) Foreign Application Priority Data

Mar. 11, 2020 (GB) ...................................... 2003520

(51) Int. Cl.
*A61K 35/64* (2015.01)

(52) U.S. Cl.
CPC .................................... *A61K 35/64* (2013.01)

(58) Field of Classification Search
None
See application file for complete search history.

(56) References Cited

U.S. PATENT DOCUMENTS

| | | | | |
|---|---|---|---|---|
| 10,383,899 | B2 * | 8/2019 | Leonard | A61P 31/04 |
| 2010/0092439 | A1 * | 4/2010 | Sherman | A61P 31/00<br>424/93.42 |
| 2017/0319631 | A1 * | 11/2017 | Leonard | A61P 37/04 |

OTHER PUBLICATIONS

Sun (CN 103908668 A—English translation)—2014.*

* cited by examiner

*Primary Examiner* — Susan Hoffman
(74) *Attorney, Agent, or Firm* — Ware, Fressola, Maguire & Barber LLP

(57) ABSTRACT

A pathogen's resistance to immune surveillance is controlled using a controlled amount of Cytokine IL-10.

4 Claims, 1 Drawing Sheet

Results
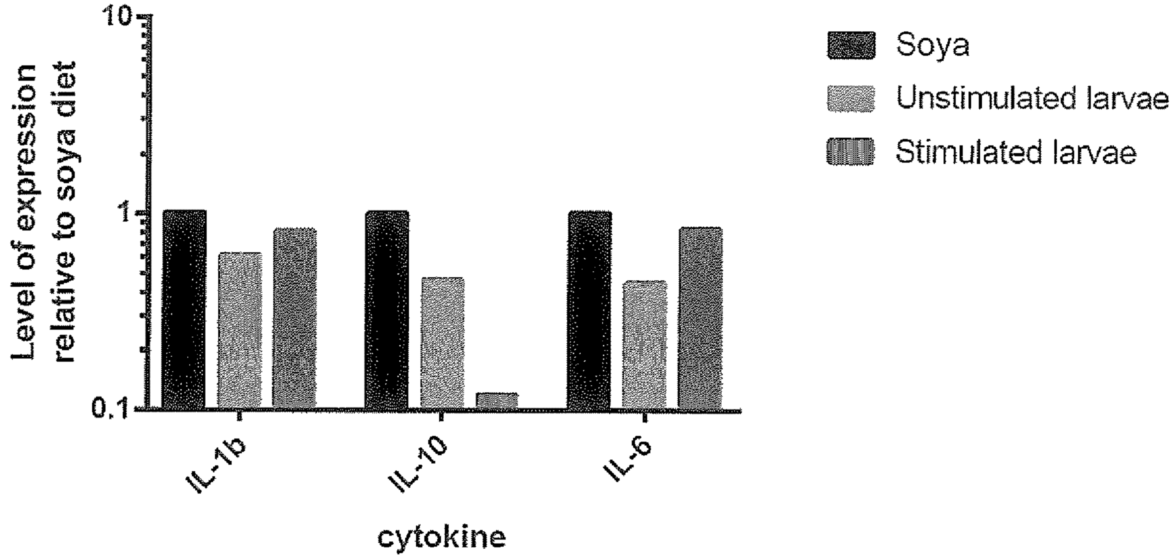

CONTROLLING A PATHOGEN'S RESISTANCE TO IMMUNE SURVEILLANCE

CROSS REFERENCE TO RELATED APPLICATION

This application claims priority under 35 USC § 119 to British Patent Application No. 2003520.0 filed on Mar. 11, 2020, which is hereby incorporated by reference in its entirety.

FIELD OF THE INVENTION

This invention relates to a method of controlling a pathogen's resistance to immune surveillance and is particularly concerned with the use of anti-inflammatory Cytokine IL-10, which is produced as a feedback regulator to ensure that an immune response does not go into overdrive. It decreases the production of AMP's and other immune control mechanisms.

SUMMARY OF THE INVENTION

According to a first aspect of the present invention there is provided a method of controlling a pathogen's resistance to an animal's immune system, which includes the use of a controlled amount of Cytokine IL-10.

BRIEF DESCRIPTION OF THE DRAWING

The single FIGURE of the accompanying drawing shows the results of the procedure hereinafter described.

DESCRIPTION OF THE PREFERRED EMBODIMENT

Adult *Lucilia serricata* were allowed to lay eggs in a 1:1:1 mixture of wheatgerm, yeast and milk powder that had been solidified with agar. This mixture containing eggs was split into portions and at hatch larvae were either challenged with *Pseudomonas syringae* or left unchallenged. After 4 days larvae were harvested, washed to remove feed and freeze dried to a moisture content of 15%. Larvae were then ground to a fine powder in a chilled pestle and mortar.

Groups of 18 day-old Ross broiler chicks were housed in biosecure facilities and fed commercial chick crumb supplemented with 10% w/w of either soya meal (to balance protein levels with feed containing larvae) or 10% w/w crushed stimulated *Lucilia larvae.*

At 3-days old birds were infected orally with $10^5$ cfu *Campylobacter jejuni* strain M1.

At 8-days old birds were euthanised and the caecal tonsil immediately placed into RNA later. mRNA was extracted using a Qiagen kit and examined for IL-6 (Th2), IL-10 (regulatory) and IL1β (Th1, pro-inflammatory) by quantitative RT-PCR. Expression of each cytokine was normalised to 28 S expression and shown relative to the level of expression seen in birds fed the soya diet.

In birds fed stimulated larvae, IL-10 expression was significantly lower than seen in birds fed the soya control diet. Levels of IL-1β and IL-6 were not significantly different between groups, indicating that no diet was associated with the induction, or repression, of Th1 or Th2 immune responses. In humans with IBD IL-10, depression has been associated with an inability to control pro-inflammatory Th1 responses, but the expression of IL-1β indicates that no such relationship exists here. Instead, here there is the potential that IL-10 expression may have been decreased as there is generally less activation of the immune system (1) in birds fed stimulated larvae.

The stimulation of the larvae may be effected by any micro-organism or part thereof that is recognized by the larvae by its Pathogen Associated Molecular Patterns (PAMPs) and perceived as a pathogen and that leads to an immune response in the larvae.

Research into the immune function in the model insect *Drosophila*, has provided significant understandings of animal and human immune systems.
In particular, the Innate Immune system has been very much conserved, and homologous signalling pathways are evident such as from the Toll and Imd of insects to the TLR-MyD88 and TLR-TRIF of humans.

It has been established that Insect Antimicrobial Peptides (AMPs, active components of the Innate Immune system) are active against human and animal pathogens.

The Immune system of higher animals, including humans, has evolved and new layers of complexity and effectiveness in the form of the adaptive immune system have developed. This has occurred within the environment of an evolving pathogen's capacity to resist animal immune function.

In response to pathogen infection in humans, a molecular signalling cascade is initiated, as exemplified by Interferons 1 and 3, to stimulate the production of a range of different components to address and resolve the infection. This 'energised' environment is produced quickly to suppress pathogen reproduction and negate any detrimental signalling from the pathogen.

This signalling cascade, once initiated, requires a process that then acts in a feedback manner to dampen and control the production of gene products. The Cytokine, Interleukin 10 (IL-10), is the prime molecular messenger for establishing a return to normality. However, the timing of its production, and its overall quantity of production has to be in accordance with the resolution of the pathogen infection. Its over-production in the early stage of an infection can lead to the pathogen obtaining a foothold in host tissues and organs, a misalignment then occurs of the Innate immune system, i. e. T-Cell Chemotactic AMP production, and the specific Adaptive T-cell Antibody response, such that specific antibodies against the pathogen are not produced, leading to a chronic infection of the pathogen.

Although the production of IL-10, is normally dependent on host regulatory mechanisms, this is not always the case. Various pathogens can subvert this process by either promoting the host to produce IL-10, or in the case of the Respiratory Synctial Virus RSV, increasing the production of the IL-10 receptor, or having obtained a gene for IL-10 production, produce it themselves. The Epstein Barr virus (EBV) produces an IL-10 homologue (BCRF1) with a 91% identity to human IL-10, as a precursor of the viral structural proteins during the productive phase of the viral cycle and release it, thus undermining the host's inflammatory response to infection. The Epstein Barr Virus is associated with several forms of cancer, including Biurkitt lymphoma, Nasophayngeal carcinoma, Hodgkin lymphoma, gastric carcinoma.

Any reduction of an animal's immune system and surveillance, such as through IL-10 production, will create an environment in which cancerous cells are not responded to at the cellular level.

The Human CMV expresses IL-10 during viral latency.

The elevated levels of IL-10, in the presence of 'not particularly virulent' viral pathogens, may not pose direct health issues to an animal, however, in the case of joint infection with other bacterial pathogens, that did not have IL-10 enhancement or productive capabilities, this may lead to serious bacterial infections, such as *Staphylococcus, Streptococcus* and *Pseudomonas aeroginosa*, that could otherwise have been addressed.

Furthermore, it has now been demonstrated that Multi Drug Resistant (MDR) bacteria stimulate higher levels of IL-10, compared to non-MDR bacteria.

It has been established that the large DNA virus, Iridescent Virus-6 IIV-6, which infects *Drosophila*, encodes for many evasion proteins in addition to the characterised suppressor of RNAi. In particular it controls the transcription of Antimicrobial Peptides. It does not inhibit the whole of the immune cascade, but sufficient parts that produce a skewed immune response. Thus, Beta-amyloid, a component of the Alzheimers Disease plaque, will continue to be overproduced, and likewise cholesterol will be overproduced in blood circulatory tissues, including the heart. This has ramifications for the development of human auto-immune diseases, when the innate and Adaptive immune responses are not correctly co-ordinated. This also permits new the establishment for additional pathogens, which are not only, not controlled, these additionally create an inflammatory unresolved chronic infections along with their associated morbidities.

Elevated levels of TNF-alpha in malaria, may not indicate that this is the cause of the heightened infection, but that it is playing a part that is overproduced, whilst other parts of the immune system are down-regulated due to increased IL-10 production.

The resolution of an infection, and the positive health status that derives from this, requires an accommodation of the preferred balance of pro-inflammatory and anti-inflammatory cytokines. This will be achieved when perceived threats to immunity and correct-self are addressed.

Cancer and tumours originate from single cells that have for whatever reason duplicated either at the wrong time or in the wrong format. These 'Cancer' cells then continue to replicate leading to the formation of tumours with their associated blood capillary systems etc. The immune surveillance system has evolved to address these 'malignant' cells at a very early stage. Treating a tumour is very much a case of locking the stable door after the horse has bolted. What is required is to support the immune system throughout the life history of the individual, man or animal, and in particular at an early stage of any malignant/pathogen threat.

The virally produced immune-suppression environment, including the anti-inflammatory effects of induced or pathogen produced IL-10, create a situation where anti-cancer components such as TNF-alpha are down-regulated. This creates a situation in which the cancer cells can flourish and tumours grow.

It is now realised that Immunotherapy for cancer requires a change of 'reverting Immune-suppression'. This can be achieved by, amongst others reducing IL-10 activity. However, whereas conventional approaches might be to produce Antibodies against IL-10 and, therefore, complete elimination of the IL-10 Cytokine, this will lead to a totally inflammatory environment which will be detrimental to overall wellbeing. The present invention, which re-addresses the balance of inflammatory/anti-inflammatory cytokines, (by a reduction of IL-10, not its elimination), towards a more pro-inflammatory, immune active state, will establish a situation in which the causative agent of the inflammation can be more readily dealt with, the inflammatory signals are then reduced, and the anti-inflammatory network will have less to contend with.

Research into the immune function in the model insect Drosophilia has provide significant understandings of animal and human immune systems. In particular, the innate immune system has been very much conserved and it has been established that Antimicrobial Peptides (AMPs) are active against human and animal pathogens.

The immune system of higher animals, including humans, has evolved and new layers of complexity and effectiveness in the form of the adaptive immune system have developed. This has occurred within the environment of an evolving pathogen's capacity to resist animal immune function. In response to pathogen infection in humans, a molecular signaling cascade is initiated to stimulate the production of a range of different components to address and resolve the infection. This "energized" environment is produced quickly to suppress pathogen reproduction and negate any detrimental signaling from the pathogen.

This signaling cascade, once initiated, requires a process that then acts in a feedback manner to dampen and control the production of gene products. The Cytokine, Interleukin 10 (IL-10), is the prime molecular messenger for establishing a return to normality. However, the timing of its production and its overall quantity of production has to be in accordance with the resolution of the pathogen infection. Its over-production in the early stages of an infection can lead to the pathogen obtaining a foothold in host tissues and organs. A misalignment of the innate immune system can then occur.

Elevated levels of Cytokine IL-10 in the presence of not particularly virulent viral pathogens may not pose direct health issues to an animal. However, in the case of joint infection with other bacterial pathogens that do not have Cytokine IL-10 enhancement or productive capabilities, this may lead to serious bacterial infections that could otherwise have been addressed.

What is claimed is:

1. A method of controlling the resistance of a pathogen to an animal's immune system, wherein the method comprises the steps of:

(i) challenging larvae with a micro-organism or part thereof that is recognized by the larvae by its Pathogen Associated Molecular Patterns and perceived as a pathogen to provide stimulated larvae;

(ii) feeding the animal with the stimulated larvae;

wherein the amount of Cytokine IL-10 is controlled in the animal following subsequent exposure of the animal to a pathogen; and (iii) measuring the amount of Cytokine IL-10.

2. The method as claimed in claim 1, in which the micro-organism is *Pseudomonas syringae*.

3. The method as claimed in claim 1, in which the pathogen is *Campylobacter jejuni*.

4. The method as claimed in claim 1, in which the larvae are *Lucilia serricata*.

* * * * *